United States Patent [19]

Chambers et al.

[11] Patent Number: 4,603,752
[45] Date of Patent: Aug. 5, 1986

[54] SPEED AND DIRECTION CONTROL APPARATUS FOR A VEHICLE

[75] Inventors: Gary C. Chambers, Burdett; Leonard V. Hychalk, Painted Post, both of N.Y.

[73] Assignee: Figgie International Inc., Willoughby, Ohio

[21] Appl. No.: 680,941

[22] Filed: Dec. 12, 1984

[51] Int. Cl.⁴ ............................................. B62D 11/04
[52] U.S. Cl. ........................................ 180/6.4; 74/482; 74/501 R; 74/507; 180/6.48; 180/333
[58] Field of Search ........................ 180/6.3, 6.48, 333, 180/6.32, 6.34, 6.36, 6.38, 6.4; 74/417, 481, 482, 501 R, 505, 507; 267/150

[56] References Cited

U.S. PATENT DOCUMENTS

| | | | |
|---|---|---|---|
| 2,412,486 | 12/1946 | Wilson | 267/150 X |
| 2,890,595 | 6/1959 | Loeffler | 74/505 X |
| 3,118,321 | 1/1964 | Rinke | 74/507 X |
| 3,428,136 | 2/1969 | Johannsen et al. | 172/285 |
| 3,459,273 | 8/1969 | Leinhauser et al. | 180/6.48 |
| 3,526,153 | 9/1970 | Howell et al. | 180/6.48 |
| 3,528,519 | 9/1970 | Case | 180/6.48 |
| 3,550,708 | 12/1970 | Paramythioti | 180/6.48 |
| 3,581,497 | 6/1971 | Krumbolz | 180/6.48 |
| 3,596,732 | 8/1971 | Glass et al. | 180/6.48 |
| 3,604,284 | 9/1971 | Houk | 180/6.48 |
| 3,611,827 | 10/1971 | Bottum et al. | 180/6.48 |
| 3,613,817 | 10/1971 | Glass et al. | 180/6.48 |
| 3,647,011 | 3/1972 | Baumgartner | 180/6.48 |
| 3,658,284 | 4/1972 | Haasl | 267/150 X |
| 3,666,033 | 5/1972 | Haug | 180/6.48 |
| 3,712,403 | 1/1973 | Pakosh | 180/6.48 |
| 3,777,833 | 12/1973 | Koch | 180/6.48 |
| 3,782,488 | 1/1974 | Williamson | 180/6.48 |
| 3,876,021 | 4/1975 | Baumgartner | 180/6.48 |
| 3,897,840 | 8/1975 | Molzahn et al. | 180/6.48 |
| 4,009,556 | 3/1977 | Molzahn | 180/6.48 |
| 4,040,306 | 8/1977 | Jensen | 74/481 X |
| 4,202,422 | 5/1980 | McLean | 180/6.48 |
| 4,281,737 | 8/1981 | Molzahn | 180/6.48 |
| 4,399,882 | 8/1983 | O'Neill et al. | 180/6.48 |

Primary Examiner—John J. Love
Assistant Examiner—Charles R. Watts
Attorney, Agent, or Firm—Christel, Bean & Linihan

[57] ABSTRACT

A speed and direction control apparatus for a skid steer vehicle of the type having right and left driven wheels which are caused to be operated by variable displacement pumps. The control apparatus is similar to that found in normal highway vehicles in that a steering wheel is provided for controlling the turning of the vehicle and a foot pedal is provided for controlling the speed of the vehicle. One end of each of a pair of push-pull control cable assemblies is used to move the control arms of the variable displacement pumps and the other end of the pair of control cables are in turn secured to a rotatable element which is in turn supported for rotation on a portion of a rotatable steering column. The rotatable element can be rotated by the steering wheel to cause one control arm to be displaced with respect to the other control arm to effect turning of the vehicle. The portion of the steering column on which the rotatable element is supported can be telescoped within another portion of the steering column in response to movement of the foot pedal to cause the speed of the vehicle to be varied. Various springs are provided for returning the parts to a centered position.

10 Claims, 16 Drawing Figures

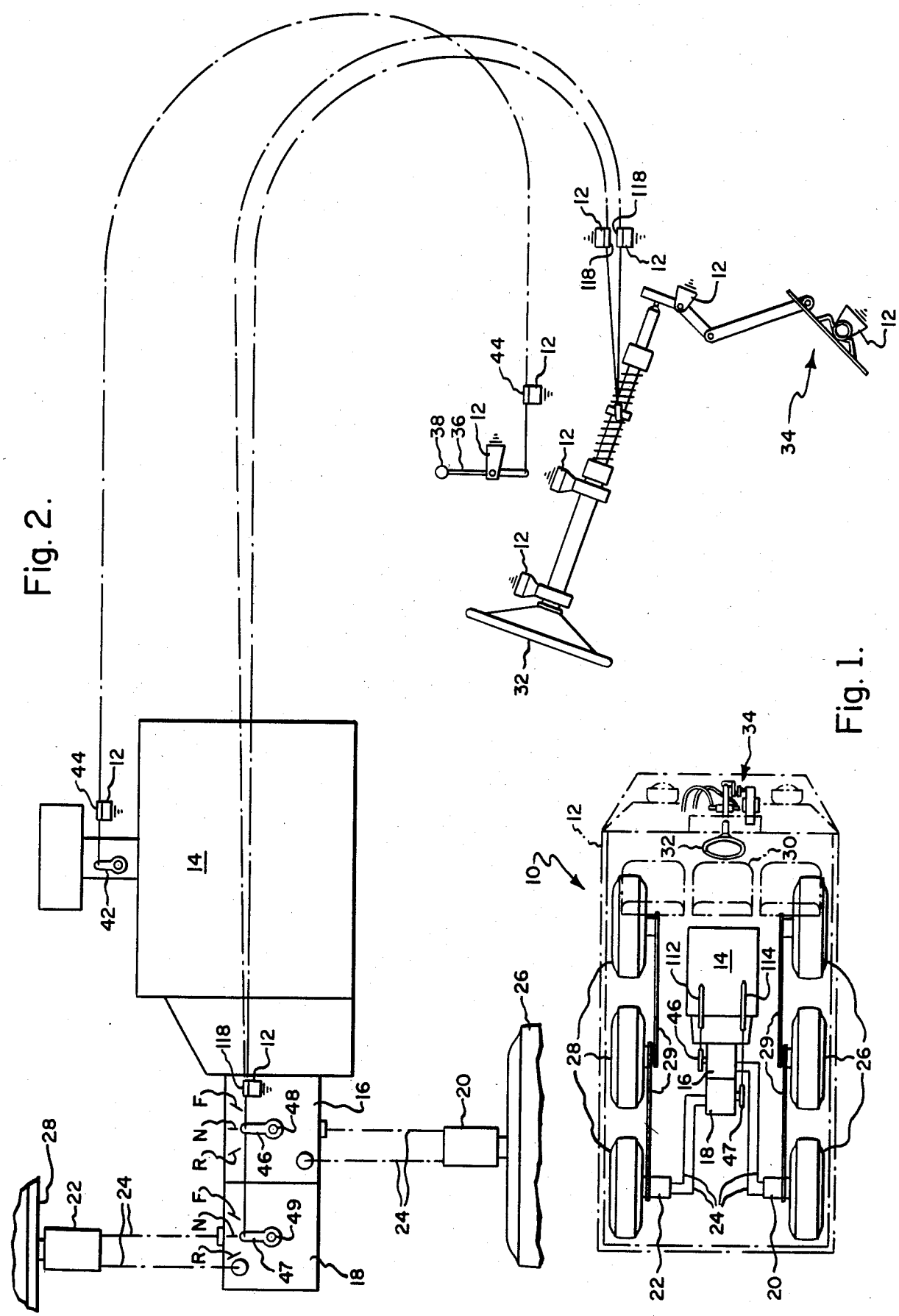

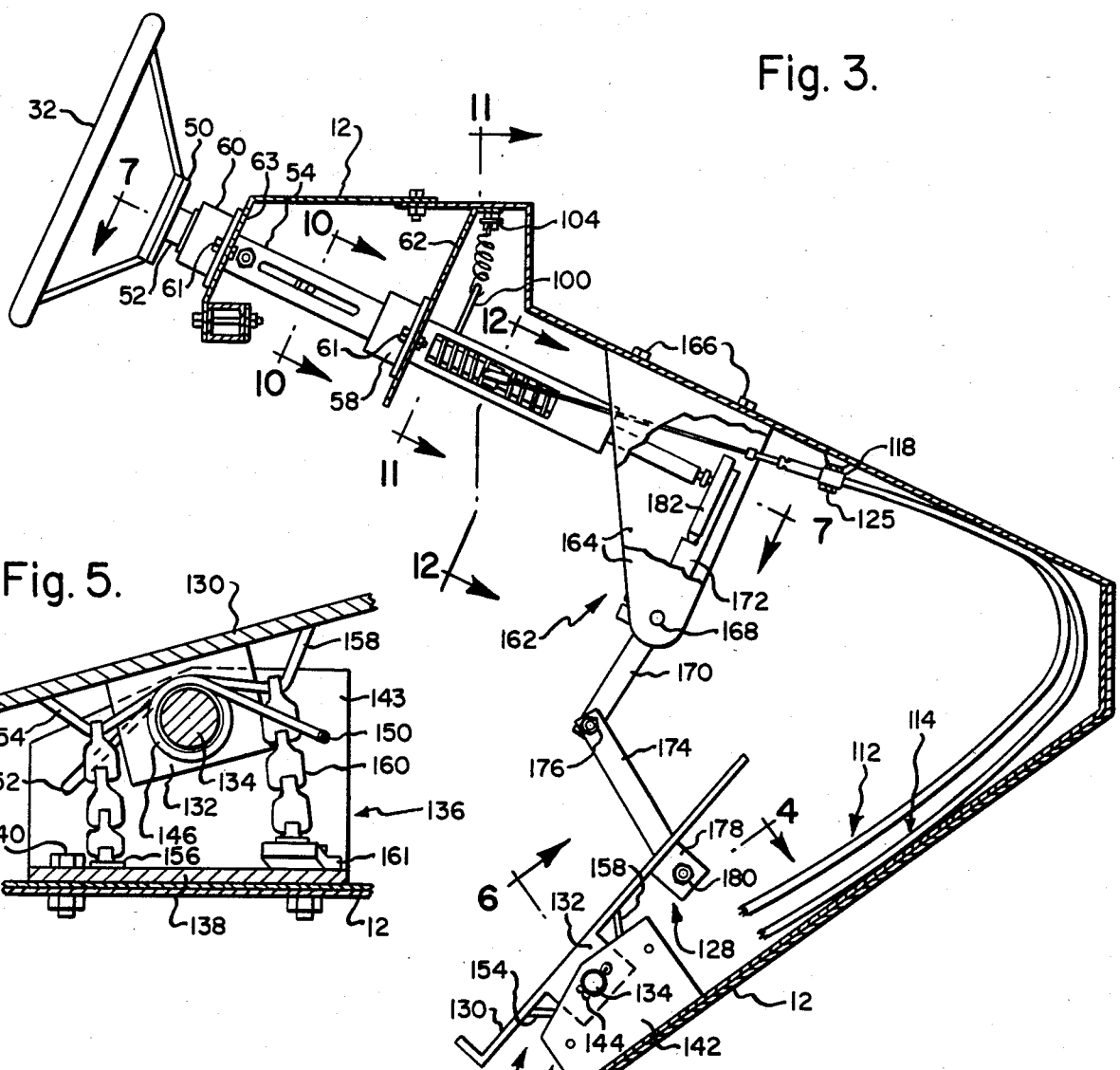
Fig. 3.
Fig. 5.
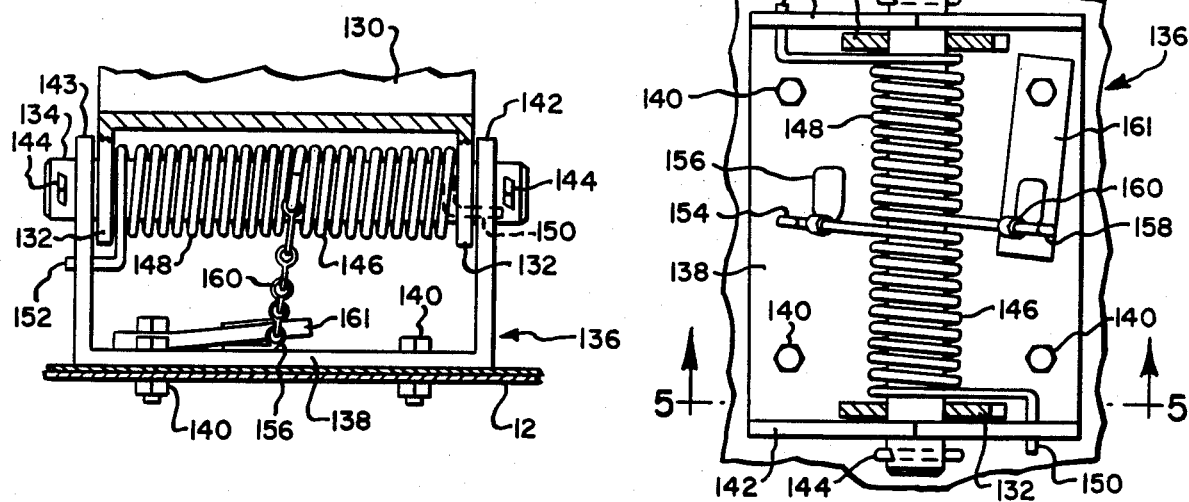
Fig. 6.
Fig. 4.

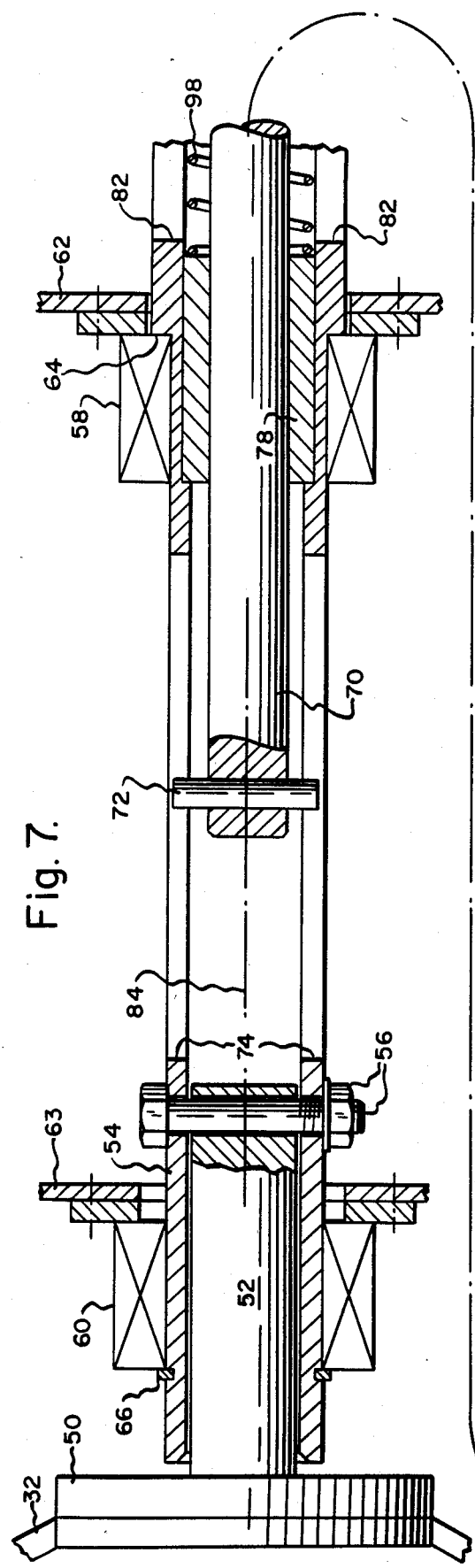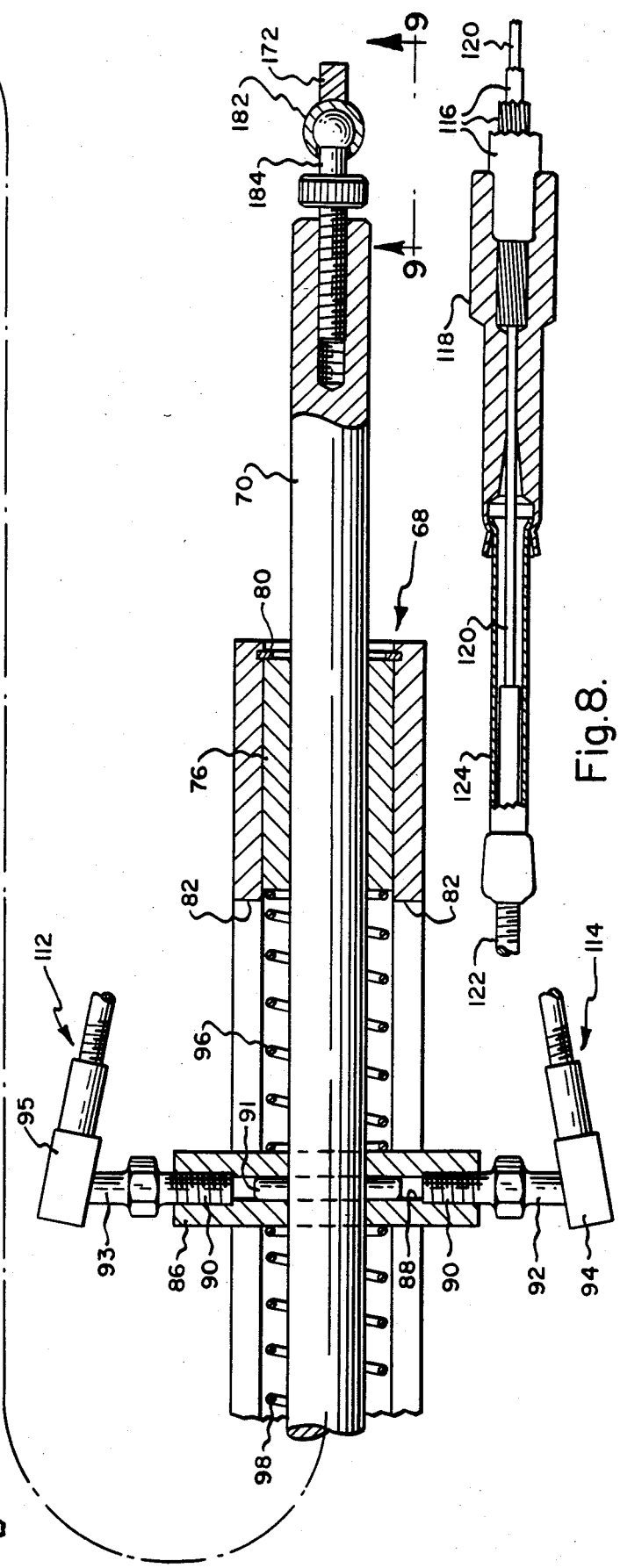
Fig. 7.
Fig. 8.

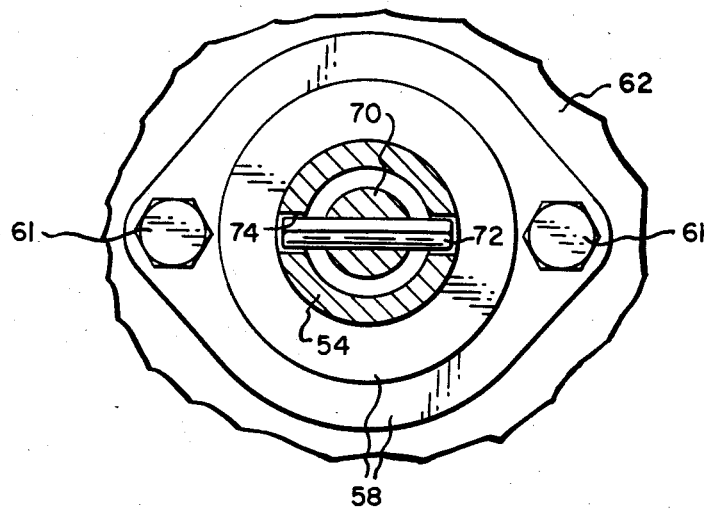
Fig. 10.
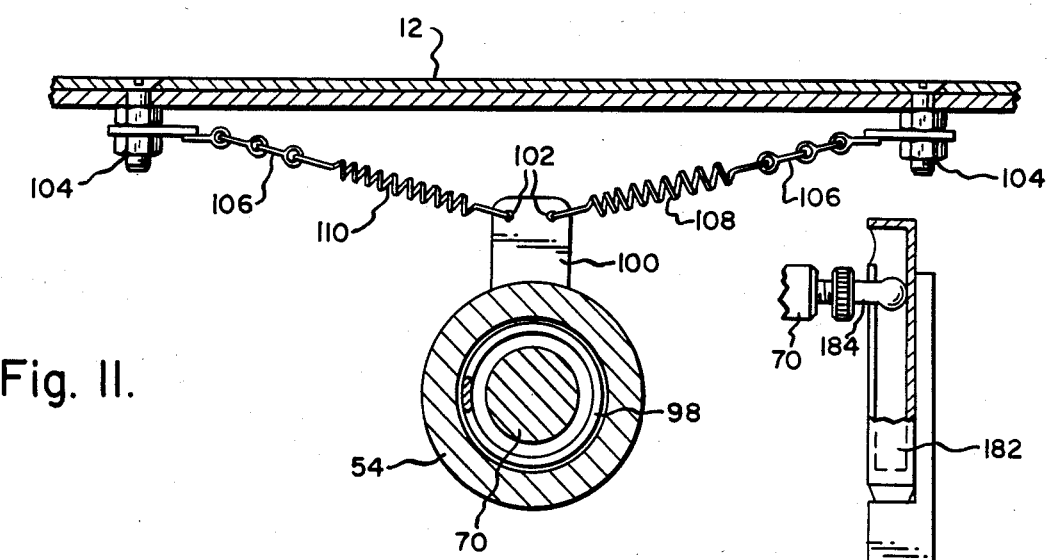
Fig. 11.
Fig. 9.
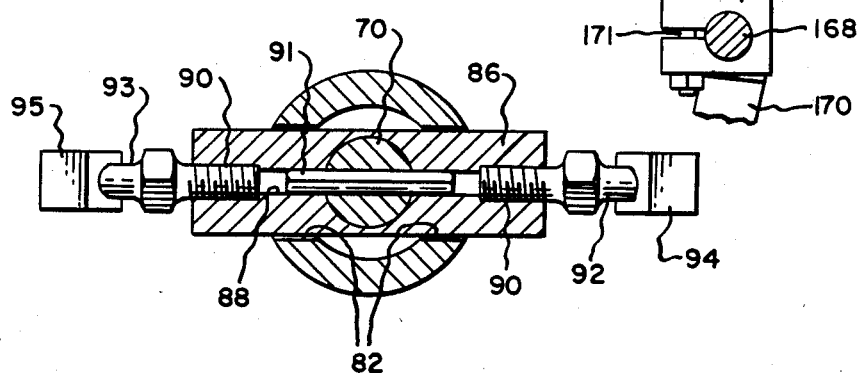
Fig. 12.

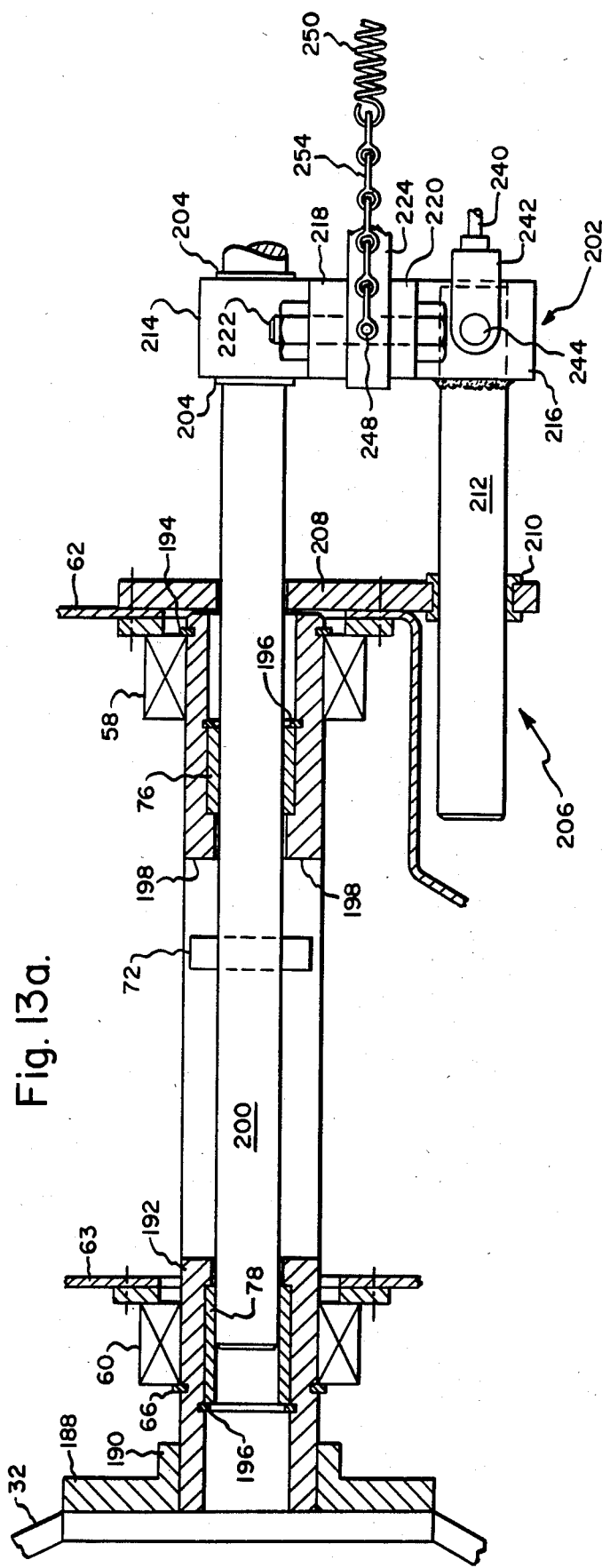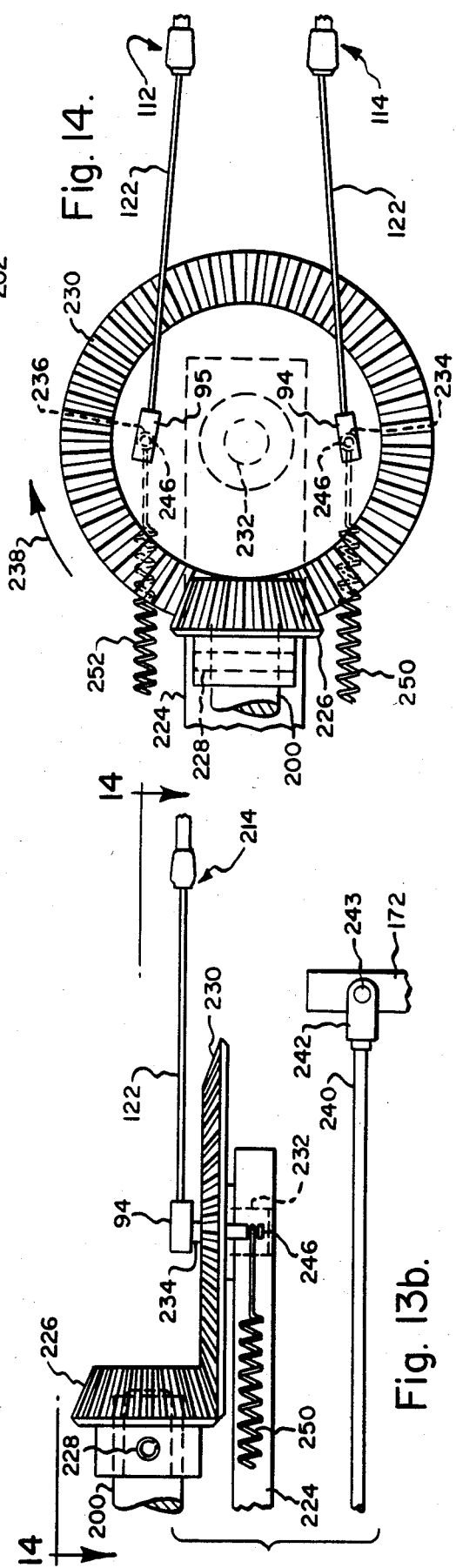

SPEED AND DIRECTION CONTROL APPARATUS FOR A VEHICLE

FIELD OF THE INVENTION

The present invention relates generally to a speed and direction control apparatus for a vehicle and more particularly to a speed and direction control apparatus for a skid steer vehicle of the type having right and left driven wheels which are caused to be operated by variable displacement pumps.

BACKGROUND ART

It is relatively common practice to steer an off-the-road vehicle by independently controlling right and left driven wheels whereby the steering is achieved by driving one set of right or left wheels at a differing speed or direction with respect to the other set of wheels. Thus, steering can be achieved in a relatively simple manner, and the mechanism used for steering is also used for driving the vehicle at varying speeds in forward and reverse directions. In a typical example, a vehicle is provided with right and left drive wheels which are driven by independent hydraulic motors. The right hydraulic motor is in turn connected to a right variable displacement pump, and the left hydraulic motor is connected to a left variable displacement pump. Each of the variable displacement pumps is provided with a control arm which varies the position of a swash plate within the pump. By varying the position of the control arms the output of the pumps are varied causing the motors to be driven at varying speeds and directions. Thus, the speed of the vehicle can be varied and the vehicle can also be turned by causing one motor to rotate faster than the other or even by causing one motor to rotate in a differing direction than the other.

A typical representation of the prior art is U.S. Pat. No. 3,897,840. It can be seen from an inspection of this patent that the vehicle speed and direction control system differs from the normal over the highway control system. Thus, in this patent, a steering wheel is provided which facilitates the steering of the vehicle, but the speed in both forward and reverse directions is controlled by a hand lever. Thus, as the control system is somewhat different from that normally encountered by a highway vehicle, it is necessary to provide the operator either with prior instruction and/or time to familiarize himself with the vehicle operation.

U.S. Pat. No. 3,550,708 also discloses a similar system wherein both a steering wheel and a foot pedal control are provided. However, in this design turning is directly proportional to the speed of the vehicle. Thus, at a stop position, no steering can be achieved whereas, in the prior patent, a pivot steer can be achieved. At a slow speed, only a slow rate of steer can be achieved, however, at high speed, a high steering rate can be achieved, which is of course, undesirable.

OBJECTS AND SUMMARY OF THIS INVENTION

In accordance with the objects of this invention a relatively normal operator speed and direction control apparatus is provided for a vehicle of the class described.

It is a further object of the present invention to provide a speed and direction control apparatus wherein control arms on variable displacement pumps (or motors) can be controlled by the use of push-pull cables, the push-pull cables in turn being connected to a steering system of the type provided with a steering wheel for controlling the turning of the vehicle and a foot pedal for controlling its speed.

It is another object of the present invention to provide a speed and direction control apparatus of the class set forth above wherein the steering and speed control members will be returned to a neutral position or a centered position should the operator become disabled.

A still further object of the present invention is to provide a steering and direction control apparatus for a vehicle of the class described wherein the location of a steering wheel assembly and a foot pedal assembly are independent of the location of the control arms of the variable displacement pumps.

The above objects and other objects and advantages of the present invention are accomplished by providing a steering wheel assembly including a steering wheel which is connected to a rotatable steering column which has keyed within it a telescoping steering shaft. The steering shaft, in one embodiment, is provided with a cross bar. One end of each of the control cables of a pair of push-pull cable assemblies are connected to opposed ends of the cross bar, the other ends of the control cables being connected to the control arms of right and left variable displacement pumps. A foot pedal assembly is mounted on the frame of the vehicle adjacent the steering wheel assembly and linkage is provided which extends between the foot pedal assembly and the telescoping steering shaft to cause movement of the shaft to vary the speed of the vehicle from a full speed reverse position to a stop or neutral position and then to a full speed forward position. In another embodiment the telescoping steering shaft is provided with a bevel gear which contacts a second bevel gear, the second bevel gear being in turn interconnected with the ends of the control cables. In both designs, springs are provided to return the parts to a centered steering position and to a neutral or stop position.

The foregoing features will be more fully understood after a consideration of the following detailed description taken in conjunction with the accompanying drawings.

While this invention is described in conjunction with a vehicle provided with drive wheels, it should be appreciated that this invention could also be utilized by a vehicle provided with tracks, wherein the tracks are driven by independently controlled motors. While the term "wheels" will be used for convenience throughout the following description and claims, it should be appreciated that the term "wheels" should be interpreted to include tracks in addition to wheels.

BRIEF DESCRIPTION OF THE DRAWINGS

FIG. 1 is a plan view of a vehicle in which the principles of the present invention may be utilized.

FIG. 2 is a schematic view generally illustrating the principles of the present invention, the steering wheel assembly and foot pedal being rotated 90° with respect to the wheels for convenience of illustration.

FIG. 3 is a side elevational view of a steering wheel, foot pedal, and interrelated linkage and control system for controlling the speed and direction of a vehicle.

FIG. 4 is a section taken generally along the line 4—4 in FIG. 3.

FIG. 5 is a section taken generally along the line 5—5 in FIG. 4.

FIGS. 6 and 7 are sections taken generally along the lines 6—6 and 7—7 in FIG. 3.

FIG. 8 is a sectional view of the end of one of the push-pull cable assemblies.

FIG. 9 is a view taken generally along the line 9—9 in FIG. 7.

FIGS. 10, 11 and 12 are sectional views taken generally along the lines 10—10, 11—11 and 12—12 in FIG. 3.

FIGS. 13a and 13b are side elevational views somewhat similar to FIG. 7 illustrating an alternative embodiment.

FIG. 14 is a plan view of a portion of the structure shown in FIG. 13.

DETAILED DESCRIPTION

Figure 15:
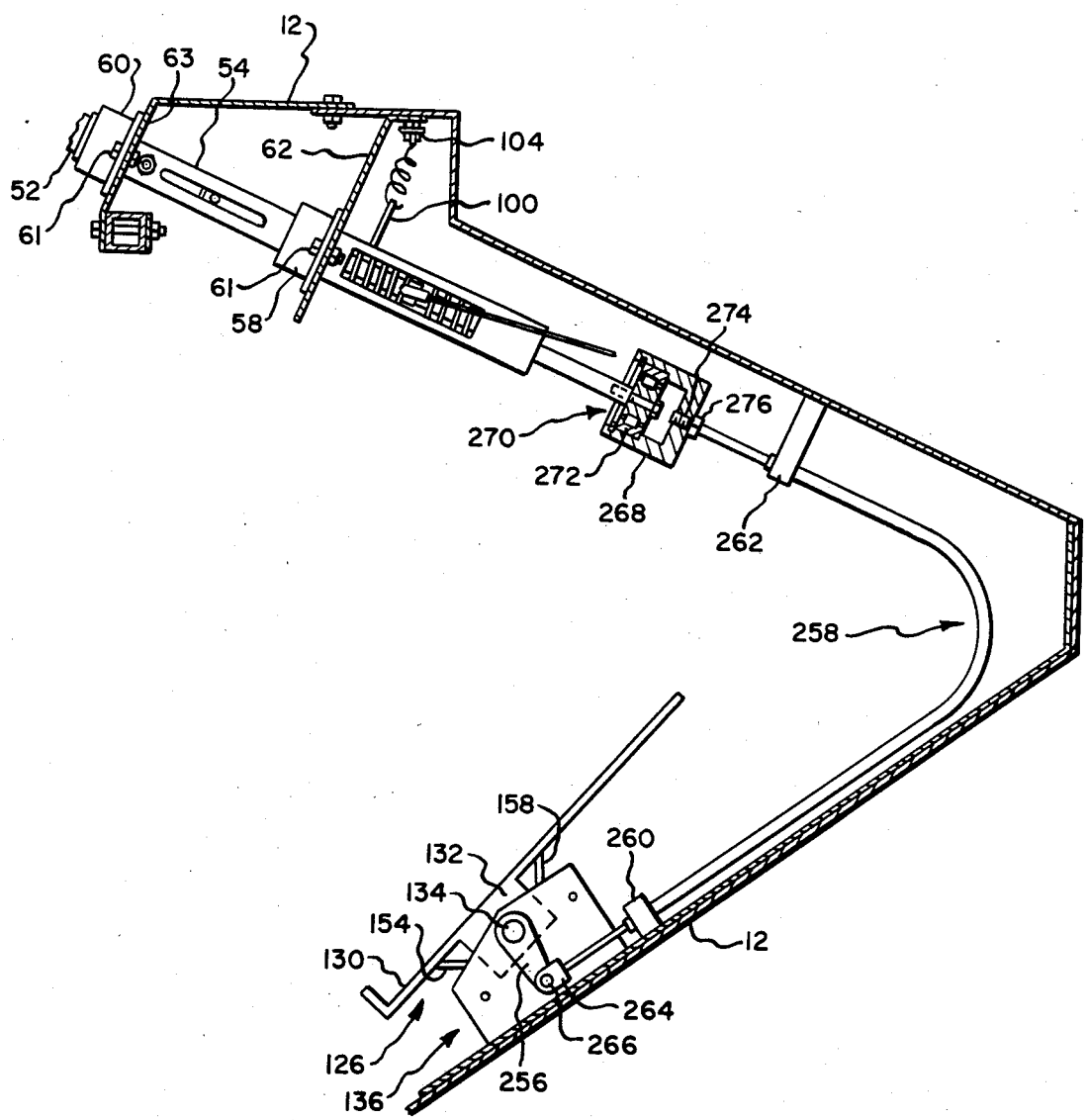
FIG. 15 is a side elevational view of a portion of the structure shown in FIG. 3 showing an alternative design for interconnecting the foot pedal assembly with the steering column assembly.

Referring first to FIG. 1, this invention is adapted to be utilized with a vehicle, indicated generally at 10, the vehicle being provided with a frame 12 on which various components are mounted. Thus, the vehicle is provided with an engine 14, the output of which is utilized to drive a pair of axially aligned variable displacement pumps which will, for convenience purposes, be referred to as a right variable displacement pump 16 and a left pump 18. The right and left pumps 16,18 are in turn interconnected with right and left hydraulic motors 20,22, respectively, by fluid lines indicated at 24. Each of the motors 20,22, is in turn coupled to ground engaging wheels for driving the same. Thus, the right motor 20 is drivingly interconnected with right wheels 26, and the left motor 22 is in turn drivingly interconnected with left wheels 28. The drive means are well known in the art and can include sprockets and chains or intermeshing gears. It should be noted, though, in the preferred embodiment, all ground engaging wheels will be driven by chains 29. Thus, the right motor 20 will drive all wheels on the right hand side of the vehicle at the same speed. Similarly, the left hand motor 22 will drive all left hand wheels at the same speed relative to each other.

The vehicle in FIG. 1 is also provided with an operator's station indicated by seat 30 and which can be at varying locations with respect to the engine and pumps. As illustrated, the seat 30 is forward of the engine 14, but it should be noted that in other vehicles it could be above, to one side, or behind the engine. The operator's station is also associated with a steering wheel 32, a foot pedal assembly indicated generally at 34, and a throttle control lever (FIG. 2) 36 for controlling the output speed of the engine. As can be seen from FIG. 2, an intermediate portion of the throttle control lever is pivoted to the frame 12 of the vehicle. The end of the lever 36 remote from the handle 38 is connected to one end of a control cable 40, the other end of the control cable being connected to the throttle (or governor) 42 of the engine. The control cable 40 is part of a conventional push-pull cable assembly of the type which is sometimes referred to as a bowden wire, the push-pull cable assembly including a sheath 44, the ends of which are secured to the frame at spaced apart locations.

With further reference to FIG. 2, it should be noted that each of the right and left pumps 16 and 18 is provided with a control arm mounted for swinging movement about a shaft. Thus, the right motor is provided with right control arm 46 secured to shaft 48. Similarly, the left hand pump 18 is provided with a left control arm 47 and a left shaft 49. The shaft is in turn connected to a swash plate (not shown) disposed within the pump, and the swash plate is movable to differing positions to control the output of the pump. Thus, each control arm can be swung from a full forward position, indicated by the letter F, through a neutral or stop position, indicated by the letter N to a full reverse position, indicated by the letter R. When the control arm 46 or 47 is in the full forward position, the output of the pump will cause the associated motor to be driven at its full forward speed. As the control arm is moved from the full forward position toward the neutral or stop position, the motor's speed will be proportionately decreased until it stops when the control arm reaches the neutral position. Continued movement of the control arm from the neutral position to the full speed reverse position will cause corresponding reverse rotation of the associated motor. Thus, if both control arms are moved together simultaneously from a full forward position to a full reverse position, the speed of the vehicle will decrease from a full forward speed to a stop and then will increase from a stop to a full reverse speed.

Referring now in greater detail to FIGS. 3 and 7, it can be seen that the steering wheel 32 is connected to a steering wheel flange 50, the flange in turn being connected to a cylindrical rod 52 which is received within one end of a rotatable steering column 54 and secured thereto by means of nut and bolt 56. The column 54 is in turn journaled for rotation within front and rear flange bearings 58,60, respectively. The flange bearings are in turn secured by means of conventional fasteners 61 to spaced apart front and rear brackets 62, 63, respectively, which are part of the vehicle frame 12. In order to prevent longitudinal shifting, the rotatable steering column 54 is provided with an intermediate shoulder 64 which bears against the front edge of the inner race of the front flange bearing 58. Additionally, the column 54 is provided with an annular groove which receives a retaining ring 66 which bears against the rear surface of the inner race of the rear flange bearing 60.

The rotatable steering column forms part of the rotatable and telescopic means indicated generally at 68 in FIG. 7. The rotatable and telescopic means further includes telescopic shaft means including a shaft 70, a rear portion of which is telescoped within the rotatable steering column 54, the portion of the shaft 70 within the steering column 54 in turn carrying a transversely extending roll pin 72, the opposed ends of roll pin 72 engaging the side walls of a pair of opposed longitudinally extending slots 74 formed in said steering column 54 about the rear portion of the shaft 70. As can best be appreciated from an inspection of FIGS. 3 and 7, the shaft 70 can reciprocate or telescope within the rotatable steering column 54. To facilitate the reciprocation, front and rear bushings 76,78 are provided, the rear bushing 78 abutting against an internal shoulder within the column 54 and the front bushing 76 being retained in place by a retaining ring 80. The rotatable steering column 54 is provided with two opposed longitudinally extending openings 82 between the front and rear bushings 76 and 78.

In addition to the rotatable and telescoping means 68 the speed and direction control apparatus of this invention is further provided with mounting means capable of being rotated about the axis 84 of the rotatable steering column 54 and shaft 70. To this end, in the embodiment illustrated in FIGS. 3–12, a cross bar 86 is provided, the cross bar having a large centrally located aperture which receives the shaft 70. The length of the cross bar is provided with an aperture 88, the ends being tapped as indicated at 90. After the cross bar has been assembled on the shaft 70 a roll pin 91 is passed through the aperture 88 and a corresponding aperture in the shaft 70 to secure the cross bar 86 to the shaft 70. Right and left ball studs 92,93, respectively, are then screwed into the tapped ends 90 of the cross bar, the ball portion of the ball studs then being received within right and left sockets 94,95, respectively, the sockets in turn being secured to adjacent ends of a pair of right and left push-pull cable assemblies in a manner which will be described in greater detail below. As can be seen from FIG. 7, shaft centering spring means are provided, the shaft centering spring means including front and rear compression springs 96,98. Adjacent ends of the compression springs 96,98 bear against opposed sides of the cross bar 86 and remote ends of the compression springs bear against the front and rear bushings 76,78, respectively. The springs are so sized that when the cross bar is in its intermediate position as shown in FIG. 7, neither spring will be under compression. However, if the shaft 70 is caused to be moved longitudinally to bring the cross bar towards either of the compression springs, that compression spring will be compressed. Thus, a spring force will be developed which will tend to return the shaft 70 and cross bar to its centered position.

It is also desirable to provide steering column centering spring means and such spring means are best illustrated in FIG. 11. To this end, it should be noted that the rotatable steering column 54 is provided with an upstanding lug 100 provided with laterally spaced apart apertures 102. Spaced apart screw fasteners 104 are secured to the frame 12. Extending from the spaced apart screw fasteners 104 are short lengths of chain 106. A pair of right and left tension springs 108,110 are in turn secured to the short lengths of chain, the right tension spring engaging one of the apertures 102 in the lug 100, and the left tension spring engaging the other aperture 102 in lug 100. The springs are so dimensioned that when the lug is in the centered position illustrated in FIG. 11, the spring forces will be equal. However, if the lug is not in the centered position, the spring forces are such that they will tend to return the lug 100 to the centered position shown.

As previously indicated, right and left push-pull cable assemblies are utilized to interconnect the mounting means which is supported by the rotatable and telescopic means 68 with the right and left control arms 46,47. Thus, the right push-pull cable assembly 112 extends from the left ball stud 93 to the right hand control arm 46 and, similarly, the left hand push-pull cable cable assembly 114 extends from the right ball stud 92 to the left control arm 47. The push-pull cable assemblies are identical with each other and are of a generally conventional construction. Thus, as best shown in FIG. 8, each cable assembly includes a sheath 116, which includes a liner, stranding wires, and a jacket, the first and second ends of the sheath in turn being secured to cable hubs 118 which are in turn interconnected to the frame 12 of the vehicle. Extending within each sheath is a slidable control cable 120. In order to extend the length between the cable hub 118 and the terminal end 94 of each control cable, the control cable is provided with a rod 122 disposed in part within a sleeve 124 which can swivel relative to the hub 118. At the end adjacent the ball studs 92 a socket 94 is carried on each rod, the socket receiving the ball of the ball stud. The other end of each control cable can be directly connected to its associated control arm, or it can be connected by means of a hydraulically operated servo valve and motor. As the construction of servo valves and motors which are operated by push-pull cables is well known in the art, such is not illustrated in the accompanying drawings. However, one such design is illustrated in U.S. Pat. No. 3,428,136. The cable hub for each of the cables adjacent the control arms 46,47 is anchored in the frame. Similarly, the cable hub for each of the cables adjacent the cross bar 86 is anchored to the frame 12 by means of a common clamp 125. As this clamp is spaced away from the axis 84 of the steering column and shaft, it can be seen that rotation of the steering column 54 and shaft 70 will cause extension of one of the control cables 120,122 and retraction of the other control cable. Thus, for example, if the steering wheel is rotated in a clockwise direction, the left hand control cable 114, which is connected to the right ball stud 92, will be extended from the position shown in FIG. 3 while the right hand control cable will be retracted. Thus, as the steering wheel is rotated to the right, this will cause the control arm 47 for the left hand variable displacement pump to be moved towards the forward position. Similarly, the control cable connected to the left hand ball stud will in turn cause the control arm 46 for the right hand variable displacement to be moved towards its reverse position. Thus, as the wheels on the left hand side of the vehicle are being driven at a faster rate forward than the wheels on the right hand side of the vehicle, a right hand turn will be accomplished. Should the operator let go of the steering wheel, the springs 108 and 110 will tend to return the steering wheel to its centered position.

Referring now to FIGS. 3–6, in order to vary the speed of the vehicle 10, foot pedal means, indicated generally at 126, are provided. The foot pedal means are in turn interconnected with the telescoping shaft by linkage means indicated generally at 128. The foot pedal means includes a pedal 130 provided with a pair of downwardly extending, spaced apart supports 132 which are in turn journaled upon a pivot shaft 134. A generally U-shaped bracket, indicated generally at 136, is provided, the U-shaped bracket having its bight portion 138 secured to the frame 12 of the vehicle by fasteners 140. The U-shaped bracket further includes a pair of parallel upwardly extending mounting elements 142,143, the mounting elements being provided with aligned apertures which receive the pivot shaft 134. The pivot shaft 134 is maintained within the aligned apertures of the mounting elements by means of pins 144. It is desirable that the foot pedal means be returned to a centered position, and to this end, pedal centering spring means are provided, the pedal centering spring means including a pair of torsion springs 146,148, the torsion springs having a main body portion disposed about the pivot shaft 134. One end of each of the torsion springs extends in a direction parallel to the shaft and is received within a suitable aperture within a mounting element 142,143. Thus, the torsion spring 146 has its first end 150 received within a suitable aperture in mounting element 142. Similarly, the torsion spring 148 has its first end 152 received within a suitable aperture in mounting element 143. The other end of each of the springs is held closely adjacent the pedal. Thus, the second end 154 of spring 146 is held closely adjacent the bottom surface of the pedal 130 by means of a chain 156, the lowermost link of chain 156 being spot welded to the bight 138. Similarly, the second end 158 of spring 148 is held closely adjacent the bottom surface of the pedal 130 by means of a front chain 160 and bracket 161, which bracket is secured in place by one of the fasteners 140. The bottom link of chain 160 is welded to bracket 161. The pedal neutral position and dead band adjustment is made by bolting bracket 161 to bight 138 by fastener 140, and by then bending the plate bracket 161 to get zero lash and zero dead band. It should be observed that if the foot pedal is rocked away from the neutral position illustrated in FIG. 5, that one of the torsion springs will be wound up and should the foot be removed from the pedal, the wound up torsion spring will return the pedal to its neutral position.

The linkage means 128 which interconnects the foot pedal means 126 with the telescoping shaft is supported by a generally U-shaped bracket indicated generally at 162, the U-shaped bracket having spaced apart arms 164 and a central bight portion which is secured to the frame by fasteners 166. A pivot shaft 168 is supported by the arms 164. Secured to the pivot shaft 168 is a bell crank assembly formed of first and second arms 170, 172, each arm being provided with a clamp 171, 173, which can be clamped about the pivot shaft 168. The outer end of the first arm 170 is in turn pivotally secured to a link 174 by means of a pivot pin 176. The other end of the link 174 is in turn pivotally secured to a flange portion 178 of pedal 130 by means of another pivot pin 180. The second arm 172 has mounted on it a slotted tube 182 which receives the ball end of a ball stud 184. The other end of the ball stud is secured into a longitudinally extending tapped aperture in the shaft 70.

From an inspection of the various figures, it can be seen that if the forward portion of the pedal is depressed it will tend to pull down link 174 causing arms 170 and 172 to rotate about the pivot shaft 168 in a counterclockwise direction as viewed in FIG. 3. This will in turn cause the shaft 70 to be telescoped in an upward and rearward direction simultaneously causing both control cables at the operator's station to be moved away from the associated sheath. This will in turn cause both control arms 46, 47 to be moved towards the full forward position of the associated hydrostatically operated pump. Should the foot now be removed from the pedal, the spring 148 will return the pedal to its normal centered position. Similarly, if a rearward portion of the pedal is depressed, the movement of the bell crank 170, 172 will be in a clockwise direction causing longitudinal shifting movement of the control cables to be such that the control arms will be moved towards their reverse position.

From the above, it can be seen that the operator of the vehicle can control both its forward/reverse speed by stepping on the foot pedal to cause either forward or rearward movement of the control cables, and similarly he can control the turning movement of the vehicle by a normal operation of the steering wheel. It should be appreciated that both of these functions can be achieved simultaneously. Thus, if the forward portion of the foot pedal has been depressed and the operator wants to execute a left hand turn, it is only necessary for him to rotate the steering wheel in a counterclockwise direction which will cause that cable which is connected to the right hand pump control arm to move the control arm towards the full forward position, and to simultaneously move the control arm for the other pump towards its full rear position. Thus, the desired turning movement will be accomplished.

It should also be apparent from the above that the steering wheel in the design illustrated in FIGS. 2–12 can only be rotated approximately 90° to either side of its centered position as otherwise the ends of the cables connected to the ball studs 92, 93 would cross. As many vehicle operators are accustomed to steering systems wherein the steering wheel may turn several times from lock to lock, it may be desired to provide another design where additional rotation of the steering can be accomplished. Such a design is illustrated in FIGS. 13 and 14.

In FIGS. 13 and 14, parts which correspond to the same parts illustrated in FIGS. 3–12 are given the same reference numerals. Thus, in the design illustrated, a steering wheel 32 is connected to a steering wheel flange 188 provided with a cylindrical portion 190 which is adapted to be disposed about a relatively short rotatable steering column 192 by set screws or in any other suitable manner. The short rotatable steering column 192 is mounted on the vehicle in the same manner that the rotatable column 56 is mounted on the vehicle. Thus, front and rear flange bearings 58, 60 receive the column 192 for rotation therein, the flange bearings in turn being connected to brackets 62, 63 by suitable fasteners (not shown). A rear retaining ring 66 is disposed in a rear annular groove on the column 192 and a front retaining ring 194 is disposed in a front annular groove and contacts the inner race of the front flange bearing 58, the front and rear retaining rings 194, 66, serving to prevent axial movement of the column 192. Disposed within the column 192 are front and rear bushings 76, 78, these bushings being located in slightly differing positions than when in the column 54. Thus, the front bushing 76 is disposed near the front bracket 62 and the rear bushing 78 is disposed near the rear bracket 63. Each of the bushings abuts against an internal shoulder within the column 192 and is held in place by a retaining ring 196. The column 192 is provided with a pair of opposed longitudinally extending slots 198 which are comparable to the slots 72.

A cylindrical shaft 200 is disposed within the bearings for axial sliding movement. A rear portion of the shaft is provided with a transverse aperture which receives a roll pin 72 that is adapted to contact the sides of the slots 198 to cause rotation of the shaft with the rotatable steering column 192. A movable support assembly 202 is journaled on the shaft 200 and is disposed between retaining rings 204 received within suitable annular grooves on the shaft in such a manner that the movable support assembly 202 can move axially with the shaft 200. Rotation preventing means 206 interconnect the movable support assembly with the frame to prevent rotation of the movable support assembly when the shaft 200 is caused to be rotated. The rotation preventing means includes an apertured plate 208 which is secured to the front bracket 62, there being a bushing 210 in the aperture in the plate 208. An intermediate portion of a cylindrical rod 212 passes through the bushing 210, a forward portion of the rod 212 being rigidly secured to a portion of the movable support assembly. The movable support assembly can include a bearing housing 214 which may include a tapered roller bearing assembly, the inner races of which contact the retaining rings 204. A rod housing 216 of similar cross section is provided, the rod housing having the rod 212 passing through the housing and being secured thereto by welding. Each of the housings are provided with outwardly extending flanges 218,220 through which suitable fasteners 222 may pass. Disposed between the housings 214 and 216 is a support plate 224 provided with apertures in alignment with the apertures in flanges 218 and 220, the fasteners 222 also being capable of passing through the apertures in the support plate. When the parts are in the assembled position illustrated in FIG. 13a the parts are secured together by the fasteners 222 which are conventional nuts and bolts in this embodiment.

As can be seen, the shaft 200 projects forwardly of the movable support assembly 202 and carries on its forward end a first bevel gear 226, the gear being secured to the shaft by roll pin 228 for rotation therewith. A second bevel gear 230 is mounted upon the support plate 224 by a shaft 232 for relative rotation with respect to the support plate 224. As the first and second bevel gears are in mesh with each other, it can be seen that rotation of the steering wheel will cause the shaft 200 to rotate with the wheel which will in turn cause the first bevel gear 226 to drive the second bevel gear 230.

The face of the second bevel gear 230 carries two diametrically opposed upwardly extending right and left ball studs 234. Sockets 94,95 which are mounted on the end of control cable rods 122 are in turn secured to each of the right and left ball studs 234 thus connecting the bevel gear to the right and left push cable assemblies 112,116. These cable assemblies are in turn secured to the frame in the same manner as in FIGS. 2-12. Thus, it can be seen that if the steering wheel is caused to be rotated in a clockwise direction (when viewed from the rear of the vehicle) it will cause rotation of the second bevel gear in the direction of the arrow 238. This will in turn cause the control rod 122 for the left hand push-pull cable 114 to be pulled away from the mounting bracket 110. The opposite movement will occur for the control rod 122 of the right hand push-pull cable assembly. This motion will in turn be transmitted to the control arms 46,47 which will in turn cause the vehicle to be turned to the right. In order to provide for axial shifting movement of the movable support assembly 202 a push rod 240 is provided. Each end of the push rod is provided with a clevis 242. One end is pinned to the bell crank arm 172 by pin 243 and the other end is pinned to the rod housing 216 by transversely extending pin 244.

In the design of FIGS. 13 and 14, the push-pull cable assemblies, the foot pedal means, and the linkage means are identical to those utilized in FIGS. 3-12. In addition, steering wheel centering means are provided. To this end, spaced apart spring mounting pins 246 are provided, each of these pins being adjacent the location of the right and left ball studs 234, but on the opposite side of the second bevel gear. In addition, further spring mounting screws or pins 248 are provided on opposite sides of the support plate 224 in the vicinity of the fasteners 222. Right and left tension springs 250,252 and chains 254 can extend between the mounting pins 246 and the mounting screws 248. These springs are so selected that their spring force will be zero when the second bevel gear is in a centered position. The springs will tend to return the bevel gear to its centered position when the second bevel gear is rotated out of the centered position. The springs and chains 254 may be the same as the springs 108,110 and chains 106. While separate shaft centering means may be provided, such as springs 96 and 98, such centering means will not be required above and beyond the centering accomplished by the torsion springs 146 and 148.

It can be seen from the above description of FIGS. 13 and 14 that varying steering ratios can be provided by varying the diameters of the respective bevel gears 226 and 230. Thus, the steering ratio will be directly proportionate to the diameter of the second bevel gear with respect to the diameter of the first bevel gear.

While the foot pedal assembly 34 can be interconnected to the shaft 70 of the steering column assembly by means of link 174, bell crank arms 170,172 and ball stud 184, it may be desirable in some installations to interconnect the foot pedal assembly to the shaft 70 by means of a push-pull cable assembly. Such a design is illustrated in FIG. 15. In this design, the foot pedal supports 132 are secured to shaft 134, the shaft 134 in turn being journaled in bracket 136. One end of the shafts extends outwardly of the bracket 136. A rock arm 256 is mounted on the shaft 134 to the outside of the bracket. (Alternatively the rock arm 256 could be secured to the shaft 134 midway between its ends, and this would require that the springs 146,148 be spaced away from each other a distance sufficient to accommodate the rock arm.) A push-pull cable assembly 258, which is of similar construction to the cable assemblies 112,114, extends between the foot pedal assembly and the shaft 70. Thus, one of the cable hubs 118 is secured to the frame 12 adjacent the foot pedal assembly 34 by a bracket 260, and the other hub 118 is secured to the frame 12 adjacent an end of the shaft 70 by bracket 262. The rod 122 of the cable assembly is secured to the shaft 70 by means of a housing or U-shaped bracket 268. To this end, the lower forward end of the shaft 70 has mounted thereon a rotatable thrust bearing assembly 270 (which may be a ball bearing). The spaced apart ends of the U-shaped bracket are secured to the outer race 272 of the bearing. The end of the rod 122 adjacent the bearing is provided with threads 274 and it is screwed into a tapped aperture in the bight portion of the U-shaped bracket 268. The parts are held in their assembled position by nut 276.

By utilizing the designs shown in the various figures a steering system may be provided for a vehicle which requires only minimal operator training. In addition, should the operator become disabled and is not able to maintain contact with the foot pedal and/or steering wheel, the vehicle will come to a stop in a straight ahead direction. Additionally, as push-pull cables are utilized for transmitting operator commands from the operator station to the variable displacement pumps, these cables can be routed in any convenient manner and thus does not require specific control linkages extending from the operator's station to the variable displacement pumps, thus facilitating the utilization of this design in varying environments. Finally, it should be noted that both the steering column assembly and foot pedal assemblies can be preassembled in relatively small subcombination packages, it only being necessary to connect the two subassemblies together.

While preferred structures in which the principles of the present invention have been incorporated are shown and described above, it is to be understood that this invention is not to be limited to the particular details shown and described above, but that, in fact, widely differing means may be employed in the practice of the broader aspects of this invention.

We claim:

1. Speed and direction control apparatus for a vehicle of the type having a frame, right and left ground engaging wheel means on said frame, right and left motors associated respectively with said right and left wheel means, and right and left variable displacement pumps associated respectively with said right and left motors, each of right and left motors being capable of being driven at varying speeds in forward or reverse directions, and each of the variable displacement pumps being provided with a neutral position to a maximum reverse position to selectively vary the output of said pump between maximum forward and reverse outputs; said speed and direction control apparatus comprising:

rotatable and telescopic means mounted on said frame, said rotatable and telescopic means including telescopic shaft means capable of being shifted relative to said frame, the rotatable and telescopic means including a rotatable steering column and a shaft, said column being journaled within a portion of the frame for rotation about its axis, and said shaft including a portion mounted within a portion of the steering column for rotational movement with said steering column and also for telescoping movement within the steering column;

mounting means interconnected to said telescopic shaft means for shifting movement therewith and capable of being rotated about an axis upon rotation of said rotatable and telescopic means;

a pair of push-pull cable assemblies, each assembly including a longitudinally movable control cable disposed within a sheath, a first end of each of said sheaths being interconnected to said frame at a first location and a second end of each of said sheaths being interconnected to said frame at a second location, a first end of each of said control cables being connected to said mounting means in spaced apart locations to either side of said axis in such a manner that when the mounting means is caused to be rotated one of the control cables will be extended relative to its sheath and the other control cable will be retracted relative to its sheath, and a second end of each of said control cables being connected to an associated control arm of a variable displacement pump;

foot pedal means mounted on said frame and including a pedal rockable between forward and reverse positions to either side of a neutral position and pedal centering spring means normally biasing said pedal to its neutral centered position; and force transmitting means interconnecting said foot pedal means with said telescopic shaft means and capable of shifting the mounting means towards and away from said first location upon corresponding movement of said foot pedal means whereby forward and reverse movement of said control arms can be obtained.

2. The speed and direction control apparatus as set forth in claim 1 wherein the steering column is provided with a pair of opposed longitudinally extending slots and wherein said telescopic shaft means further includes a transverse pin passing through said shaft and engaging said slots in such a manner that rotational movement will be imparted to said telescopic shaft means when the steering column is rotated.

3. The speed and direction control apparatus as set forth in claim 1 wherein the mounting means includes a cross bar having opposed sides and radial outer ends, the cross bar being secured to said shaft between the ends thereof for rotation and telescopic movement with said shaft, the radial outer ends of said cross bar supporting ball studs to which the first ends of the control cables are connected.

4. The speed and direction control apparatus as set forth in claim 3 wherein said steering column is provided with two opposed longitudinally extending openings, portions of said cross bar extending through said openings, and wherein said rotatable and telescopic means further includes centering shaft spring means capable of normally biasing the cross bar and the shaft to a centered position.

5. The speed and direction control apparatus as set forth in claim 4 wherein the shaft centering spring means includes a pair of compression springs disposed to either side of said cross bar and about said shaft.

6. The speed and direction control apparatus as set forth in claim 1 wherein the rotatable and telescopic means further includes steering column centering spring means capable of normally biasing the rotatable steering column to a centered position.

7. The speed and direction control apparatus as set forth in claim 6 wherein the steering column centering spring means includes a pair of tension springs extending laterally away from said rotatable steering column, each of said pair of tension springs including a first end secured to said rotatable steering column and a second end secured to said frame.

8. The speed and direction control apparatus as set forth in claim 1 wherein the rotatable and telescopic means further includes a movable support assembly journaled on said shaft, said movable support assembly being provided with rotation preventing means, a first bevel gear mounted on said shaft at a location remote from said steering column, and a second bevel gear in mesh with said first bevel gear, said second bevel gear being mounted on said movable support assembly, said second bevel gear being provided with diametrically opposed ball stud to which the first ends of each of the respective control cables is secured.

9. The speed and direction control apparatus as set forth in claim 8 further characterized by the provision of tension spring means capable of normally biasing the second bevel gear to a centered position.

10. The speed and direction control apparatus as set forth in claim 9 wherein the second bevel gear centering spring means includes a pair of tension springs extending between the movable support assembly and diametrically spaced apart locations on the second bevel gear.

* * * * *